E. HARRIS.

Bottle-Stopper.

No. 8,382. Reissued Aug. 20, 1878.

WITNESSES

B. M. Williams

John E. Fleming.

Elbridge Harris INVENTOR

By his Attys.

Henry W. Williams & Co

BEST AVAILABLE COPY

UNITED STATES PATENT OFFICE.

ELBRIDGE HARRIS, OF BOSTON, MASSACHUSETTS.

IMPROVEMENT IN BOTTLE-STOPPERS.

Specification forming part of Letters Patent No. 156,219, dated October 27, 1874; Reissue No. 8,382, dated August 20, 1878; application filed July 24, 1878.

*To all whom it may concern:*

Be it known that I, ELBRIDGE HARRIS, of Boston, in the county of Suffolk and State of Massachusetts, have invented a new and useful Improvement in Bottle-Stoppers, of which the following is a specification:

The object of my improvement is to provide a rubber stopper having provision for a cork core, as below described, by means of which the cork may be easily inserted, and yet be prevented from escaping from the rubber covering in the act of inserting it in the bottle, or at any other time. A cap is also provided which forms a part of the stopper, and is arranged to turn down around the neck of the bottle.

Figure 1:
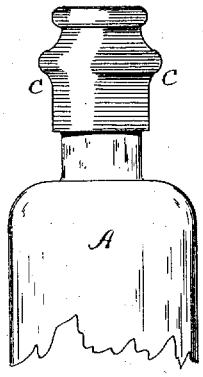
Figure 2:
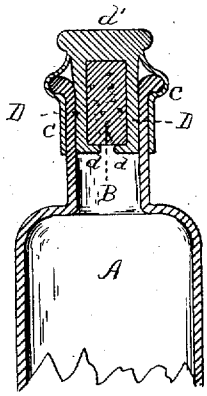
Figure 3:
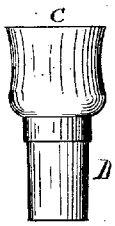
Figure 4:
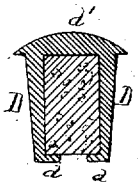

In the drawings, in which similar letters of reference indicate like parts, Figure 1 is a side elevation of a bottle having my improved stopper attached, the cap being turned down over the neck. Fig. 2 is a vertical section of the same. Fig. 3 is a view of the stopper with the cap turned up. Fig. 4 is a view of the stopper without the cap.

D is a rubber casing, having a solid head, *d'*, and its lower end provided with inward flanges *d*. The cork B is passed into the casing D, and the flanges *d* close around and hold it.

C is a cap, made in a piece with the casing D, and intended to cover the neck of the bottle A. The stopper, when provided with this cap, is inserted in the bottle by first turning the cap up, as in Fig. 3, and after placing the casing in the neck turning the cap down, as in Figs. 1 and 2.

Owing to the elasticity of the rubber, the cork is easily inserted, and owing to the flanges it is easily retained.

Having thus fully described my improvement, what I claim, and desire to secure by Letters Patent, is—

1. The stopper herein described, consisting of the rubber casing D, the solid head *d'*, and flanges *d*, for the purpose of containing a core, B, all substantially as set forth.

2. As an improved article of manufacture, a stopper composed of the rubber casing D, having a solid head, *d'*, and flanges *d*, and provided with the cap C and inserted cork core B, as set forth.

ELBRIDGE HARRIS.

Witnesses:
HENRY W. WILLIAMS,
B. W. WILLIAMS.